United States Patent
Nakagawa et al.

(10) Patent No.: US 9,274,288 B2
(45) Date of Patent: Mar. 1, 2016

(54) CONNECTOR FOR MULTILAYERED OPTICAL WAVEGUIDE

(71) Applicant: International Business Machines Corporation, Armonk, NY (US)

(72) Inventors: Shigeru Nakagawa, Tokyo (JP); Hidetoshi Numata, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/050,816

(22) Filed: Oct. 10, 2013

(65) Prior Publication Data
US 2014/0147083 A1    May 29, 2014

(30) Foreign Application Priority Data
Nov. 28, 2012  (JP) .................................. 2012-259849

(51) Int. Cl.
*G02B 6/38* (2006.01)
*G02B 6/36* (2006.01)

(52) U.S. Cl.
CPC ............ *G02B 6/3861* (2013.01); *G02B 6/3885* (2013.01); *G02B 6/3676* (2013.01); *G02B 6/3834* (2013.01)

(58) Field of Classification Search
CPC . G02B 6/02209; G02B 6/3861; G02B 6/3834
See application file for complete search history.

(56) References Cited

U.S. PATENT DOCUMENTS

| | | | | |
|---|---|---|---|---|
| 5,778,123 A | * | 7/1998 | Hagan ................. | G02B 6/4231 385/76 |
| 5,845,028 A | * | 12/1998 | Smith ................. | C12N 15/1034 385/59 |
| 5,937,128 A | * | 8/1999 | Robertsson .......... | G02B 6/1221 156/245 |
| 6,256,448 B1 | * | 7/2001 | Shahid ................. | G02B 6/3885 385/147 |
| 6,352,372 B1 | * | 3/2002 | Shahid ................. | G02B 6/3879 385/136 |
| 6,496,624 B1 | * | 12/2002 | Hikita et al. ..................... | 385/50 |
| 6,695,488 B2 | * | 2/2004 | Grabbe ................. | G02B 6/245 385/77 |
| 2010/0067852 A1 | * | 3/2010 | Dangel et al. .................... | 385/83 |
| 2014/0193120 A1 | * | 7/2014 | Hodge et al. ..................... | 385/79 |

FOREIGN PATENT DOCUMENTS

| | | | |
|---|---|---|---|
| JP | 05257031 A | * | 10/1993 |
| JP | H10142448 A | | 5/1998 |
| JP | 3117107 | | 12/2000 |
| JP | 2001004872 A | | 1/2001 |
| JP | 3742382 | | 2/2006 |
| JP | 2008040003 A | | 2/2008 |
| JP | 2011-002738 A | | 1/2011 |

* cited by examiner

*Primary Examiner* — Charlie Y Peng
(74) *Attorney, Agent, or Firm* — Tutunjian & Bitetto, P.C.; Jeff Tang

(57) ABSTRACT

Methods for fabricating connectors for multilayered optical waveguides, as well as apparatuses for multilayered optical waveguides that embody ferrules and connectors. The method of fabricating a connector includes the steps of: stacking in a containing unit of a ferrule, a plurality of optical waveguides that are each preliminarily formed in the shape of layers; and injecting resin or adhesive through a space lying between the plurality of optical waveguides and the containing unit of the ferrule, with the plurality of optical waveguides contained in a stacked manner so that resin or adhesive reaches each of the plurality of optical waveguides.

20 Claims, 9 Drawing Sheets

Design and development of connector with grooves for injection of UV-cured resin

| Setting conditions | Connection loss [dB] |
|---|---|
| After lapping (Diamond 1/4μm), w/o IMF | 0.88dB |
| After polishing (Diamond 1/10μm), w/o IMF | 0.31dB |

(* It means a connection loss at one connection point)

Figure 3

Assembly of multilayer waveguide connector (UV-cured resin injection)

Four Layer 96ch (24ch × 4) waveguide connector
Layer structure (from top side): OC/CO/UC/Base=30/45/53/122μm

Figure 6

UV glue injection structure

PWG trimming method
- "A" should be smaller than 277.5μm
- It is easy to make ferrule
- A curl of PWG is obstacle for assembly Ferrule trimming method
- "B" should be smaller than 150μm
  → preferably 50μm
- It is much difficult to make ferrule

Figure 7

Pay attention to thin wall (about 50 μm)

Not to scale
Unit : mm

Figure 8

Special MT ferrule with UV glue injection structure

Figure 9

PWG-MT Assembly Test with our special MT ferrule

Exposure a 1500mJ (1.6mW x 15min.) of an UV light (i-line).

- NORLAND "NOA68" (5000cps)      It is too dense to inpour inner grooves
- Edmund Optics "OPM55" (20cps)   It is easy to inpour inner grooves UV adhesive

CONNECTOR FOR MULTILAYERED OPTICAL WAVEGUIDE

CROSS-REFERENCE TO RELATED APPLICATION

This application claims priority under 35 U.S.C. §119 from Japanese Patent Application No. 2012-259849 filed on Nov. 28, 2012, the entire contents of which are incorporated herein by reference.

FIELD OF THE INVENTION

The present invention relates to a ferrule and a connector and to a method of fabricating the same. More specifically, the present invention relates to a structure using a multi-core optical ferrule (Mechanically Transferable ferrule) including a plurality of holes formed to serve as a plurality of position guides and also including a containing unit capable of containing in a stacking manner a plurality of optical waveguides, each of the optical waveguides preliminarily formed in a shape of layer.

DESCRIPTION OF THE RELATED ART

Figure 1:
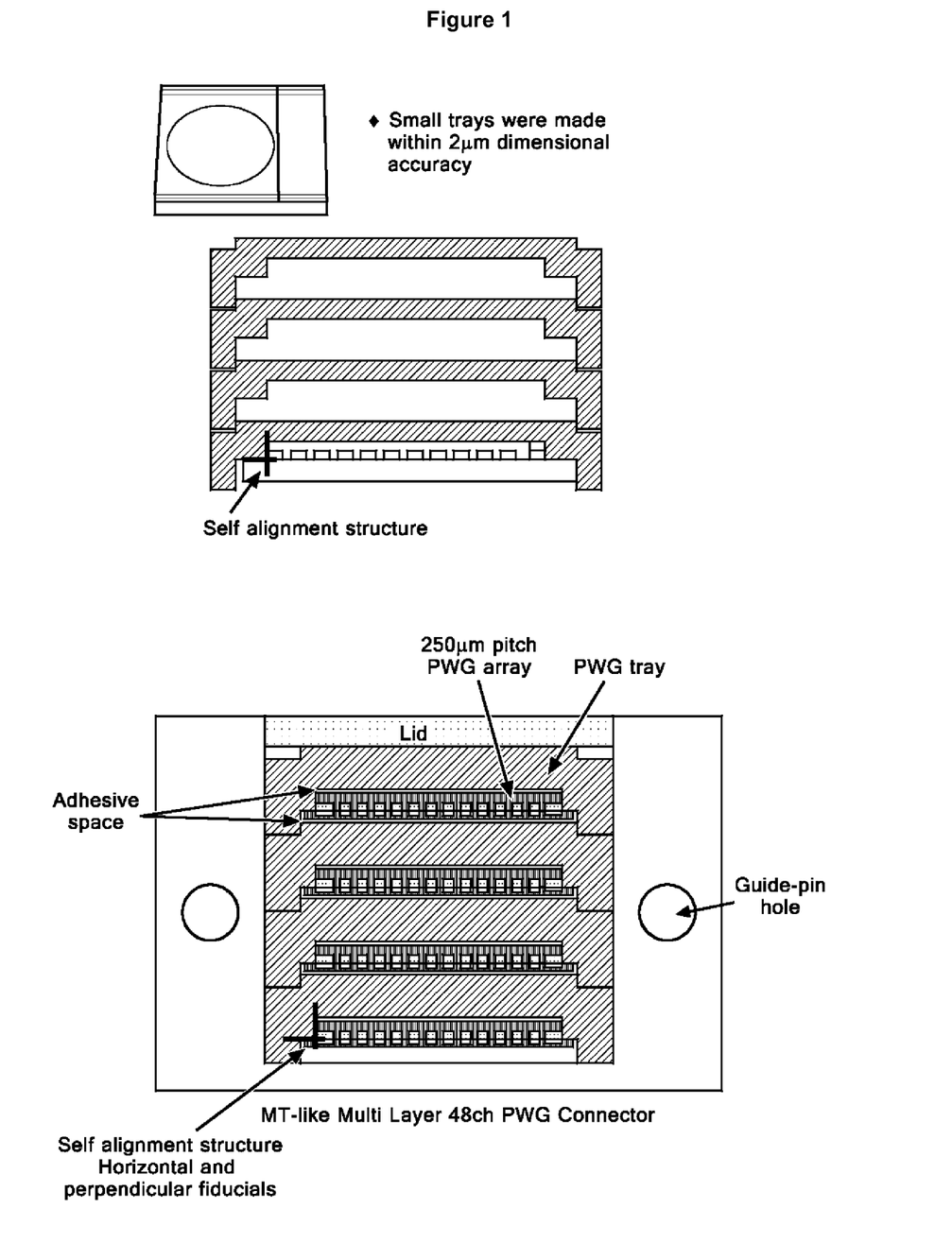
FIG. 1 is a view illustrating a structure of an MT (Mechanically Transferable) connector for multimode multilayered waveguide, developed by the present applicant in the past, the structure using in combination a dummy-core structure and a waveguide tray.

FIG. 1 is a view illustrating a structure of an MT (Mechanically Transferable) connector for multimode multilayered waveguide, developed by the present applicant in the past, the structure using in combination a dummy-core structure and a waveguide tray.

The connector is constituted of a ferrule and a fiber or a waveguide inserted in the ferrule.

The waveguide includes a core and a clad different from each other in refraction index; light travels through the core, whereby data is transferred.

Waveguide formed of a polymer material is also called a PWG (Polymer Waveguide).

Accordingly, it is necessary for a plurality of the connectors to have a principal function to maintain the connection of the end faces of the core centers, in a state where the end faces are highly precisely abutted so that the misalignment of the end faces does not occur.

When the misalignment of the end faces occurs, light cannot efficiently travel from one core to the other core, resulting in connection loss.

Multimode optical waveguides have a rectangular core size of approximately 35 µm to 50 µm, and thus there is a need to highly precisely abut the cores; single-mode optical waveguides, having a rectangular core size of approximately 5 µm, are very small, and thus there is a need to highly precisely abut the cores to a greater extent than in the multimode optical waveguides.

Taking account of the fact that multiple cores are used and that the above described function is provided, the connector is also called a multiple-core optical connector (MT connector), and the ferrule is also called a multiple-core optical ferrule (MT ferrule).

Detailed specifications have been defined for the standards of the ferrule or the connector. However, multiple holes formed to serve as multiple position guides are usually used as a positioning fiducial.

Referring to FIG. 1, two guide-pin holes correspond to the above described holes.

More specifically, the centers of the two guide-pin holes serve as a fiducial point.

Hence, a horizontal line connecting the centers of the two guide-pin holes serves as a fiducial line.

Multiple optical waveguides, each preliminarily formed in a shape of layer, are contained in a stacked manner along the above described fiducial; accordingly, the containing face of the ferrule serves as a fiducial face.

In this way, the multi-core structure is provided not only in a horizontal direction but also in a multilayered direction.

The optical waveguides, each preliminarily formed in a shape of layer, may be prepared as a laminate-shaped film.

Furthermore, there is also one obtained by curing photo-cured resin in a stacked manner in order of underclad to core to overclad.

In either case, a PWG having a shape of relatively thin layer is supplied, and PWG provided with flexibility is also called a "flexi-waveguide."

In this way, a simple "flexi-waveguide" can be used.

In the structure of FIG. 1, a passive alignment structure is used.

In this passive alignment structure, a plurality of small trays are used as a jig.

Here, a self alignment structure is used in which, in association with stacking of a plurality of trays, a new fiducial position (a part represented by the thick line) is naturally derived.

A significantly high-precision (±2 µm) mechanical processing can be applied to the plurality of small trays.

According to this structure, for the rectangular core size of 35 µm to 50 µm, the misalignment relative to the absolute position fiducial (the centers of the guide pin holes on both sides of the MT connector and the horizontal line connecting the centers) was suppressed to 10 µm or less, so that the connection loss was suppressed to 0.9 dB or so.

In addition, a space between the tray and the waveguide was also provided into which UV-curing resin (Adhesive) can be injected, allowing high-precision assembling.

However, in this way, when an easy-to-make multilayer structure (FIGS. 3 and 5) using a simple flexi-waveguide is used without using the dummy-core structure by means of the jig, there remains a problem that the space for injecting UV-cured resin in an assembly process cannot be provided.

Japanese Patents, No. JP3742382 and JP2011-2738A, describe an MT-type optical connector ferrule and a multiple-core optical connector.

However, it has not been disclosed that "a space for injecting resin is formed along a multilayered direction."

Japanese Patents, No. JP4259222, JP3117107 and JP2008-40003A, describe that, in an optical integrated circuit board, UV-cured resin is used at the time of producing a multilayer.

However, in these literatures, also, it is not disclosed that "a space for injecting resin is formed along a multilayered direction."

SUMMARY OF THE INVENTION

The present invention provides a method of fabricating a connector, the method includes the steps of: stacking in a containing unit of a ferrule, a plurality of optical waveguides that are each preliminarily formed in the shape of layers; and injecting resin or adhesive through a space lying between the plurality of optical waveguides and the containing unit of the ferrule, with the plurality of optical waveguides contained in a stacked manner so that resin or adhesive reaches each of the plurality of optical waveguides.

The present invention also provides a ferrule, including: a plurality of holes; and a containing unit arranged so as to contain in a stacking manner a plurality of optical waveguides that are each preliminarily formed in the shape of layers; wherein grooves are formed along a multilayered direction so that injected resin or adhesive reaches each of the plurality of optical waveguides, with the plurality of optical waveguides contained in a stacked manner.

An object of the present invention is to implement an easy-to-make multilayer structure using a simple flexi-waveguide.

A plurality of optical waveguides, each preliminarily formed in the shape of layers, are stacked in an MT ferrule containing unit.

With the plurality of optical waveguides contained in a stacked manner, resin or adhesive is injected through a space lying between the plurality of optical waveguides and the containing unit of the MT ferrule, so that the resin or adhesive reaches each of the plurality of optical waveguides.

While the ferrule (unit) includes the containing unit arranged so as to contain in a stacking manner the plurality of optical waveguides, each preliminarily formed in a shape of layer, the ferrule (unit) is also characterized in that grooves are arranged along a multilayered direction so that the resin or adhesive injected reaches each of the plurality of optical waveguides contained in a stacked manner.

From traces of the resin or adhesive injected, also, it can be estimated that the technical idea of the present invention has been implemented.

The present invention allows implementation of an easy-to-make multilayer structure using a simple flexi-waveguide.

DETAILED DESCRIPTION OF THE PREFERRED EMBODIMENTS

Figure 2:
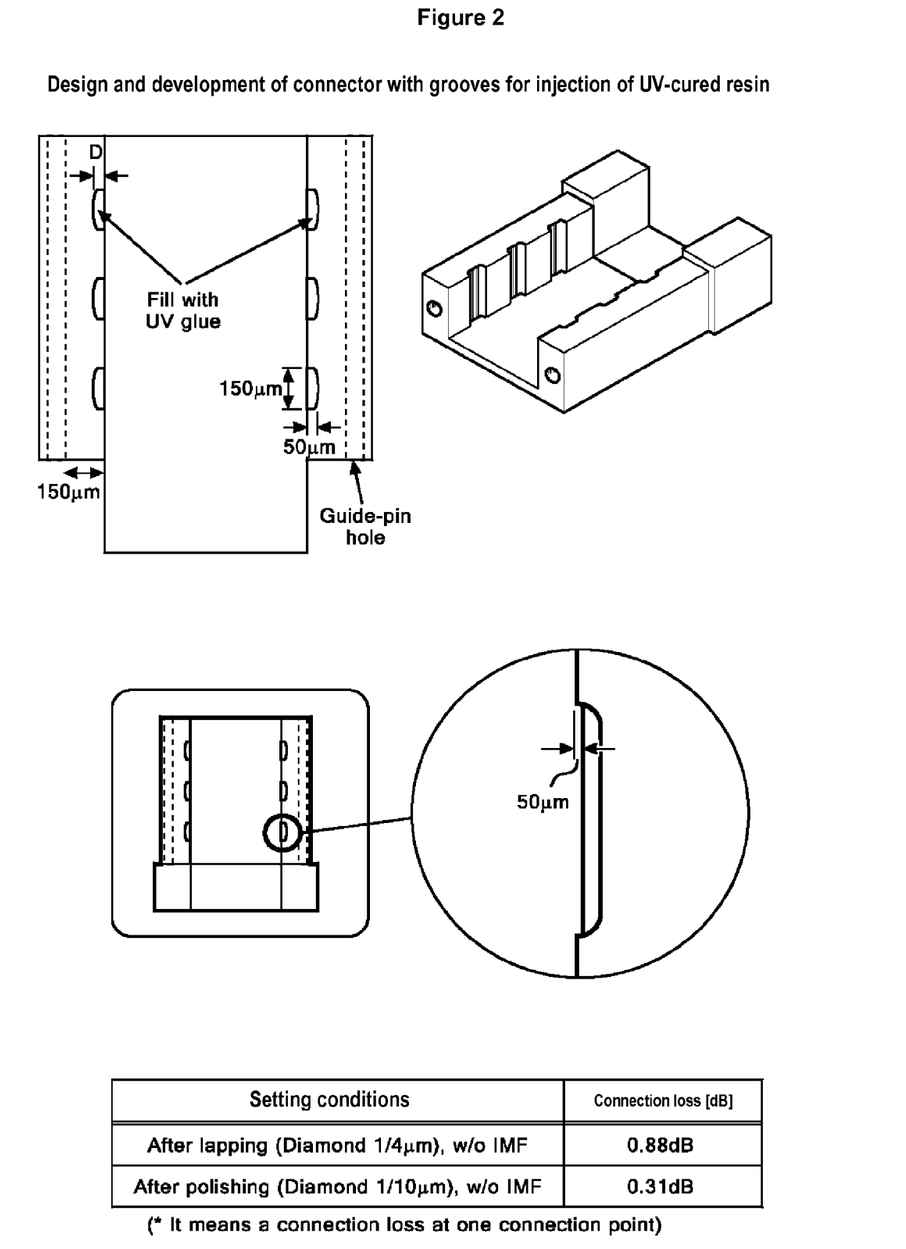
FIG. 2 is a view illustrating an MT ferrule or a ferrule according to the present invention.

FIG. 2 is a view illustrating an MT ferrule or a ferrule according to the present invention.

All fundamental constituent elements are included which perform functions required of the multiple-core optical ferrule (MT ferrule).

As a plurality of position guides, a plurality of holes are provided; this structure is the same as one described in FIG. 1.

A containing unit is included which is arranged so that a plurality of optical waveguides, each preliminarily formed in a shape of layer, are contained therein in a stacked manner.

The bottom face and the side face of the containing unit have a concave shape act as a containing unit face; these containing unit faces serve as a fiducial face.

In this way, the containing unit is arranged so that a plurality of optical waveguides, each preliminarily formed in a shape of layer, are contained therein in a stacked manner, and also includes the fiducial face relative to all of the plurality of holes.

The present invention is characterized in that grooves are arranged along a multilayered direction so that resin or adhesive injected reaches each of the plurality of optical waveguides contained in a stacked manner.

The end face of the optical waveguide in the multiple-core optical connector is usually smoothed by lapping and polishing. Thus, connection loss was measured after the lapping and also after the subsequent polishing; it was found that, after the polishing, the degree of loss was smaller.

Figure 3:
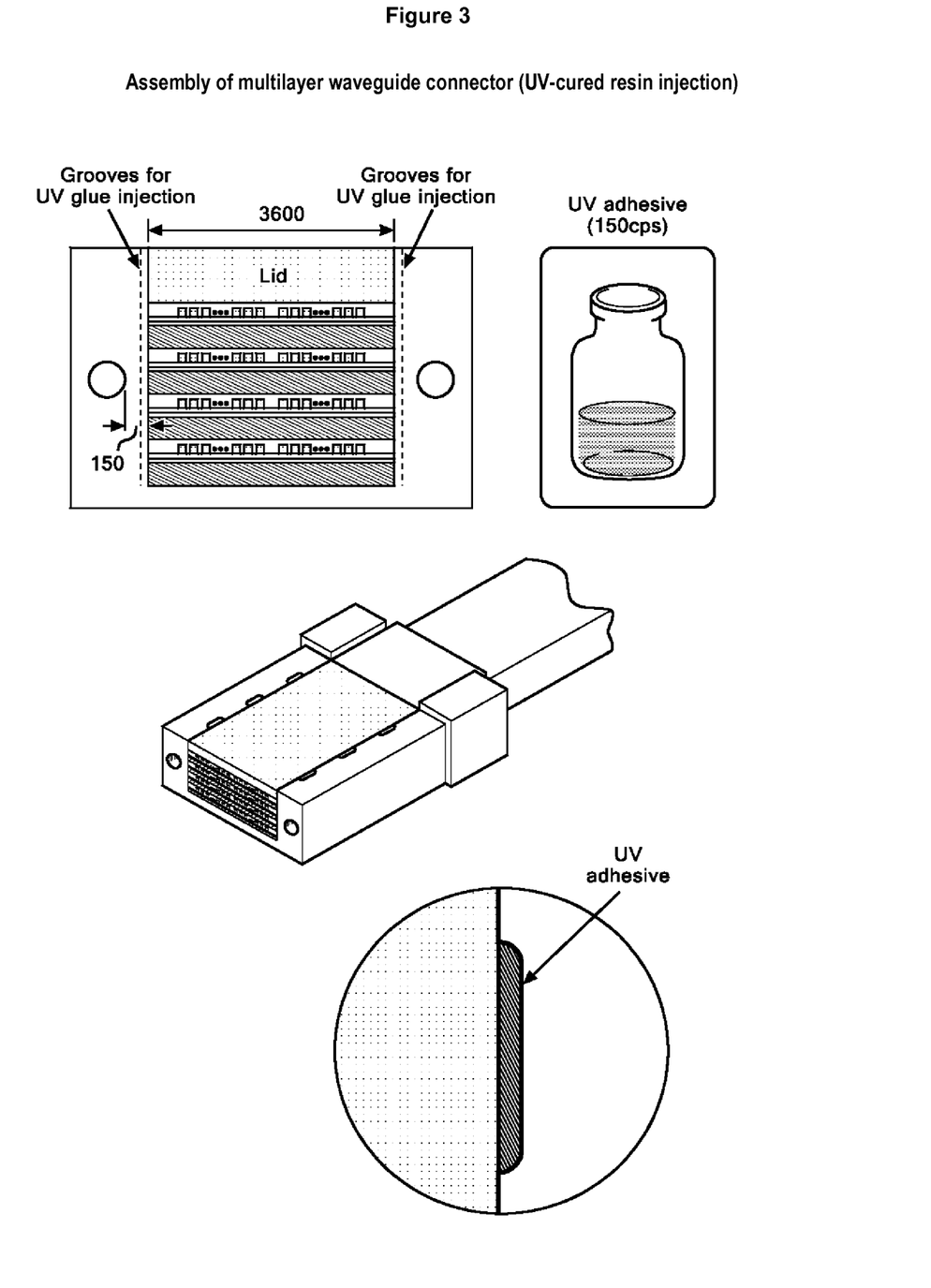
FIG. 3 is a view for explaining a method of fabricating the MT connector by use of a multiple-core optical ferrule (MT ferrule)

FIG. 3 is a view for explaining a method of fabricating the MT connector by use of a multiple-core optical ferrule (MT ferrule).

The MT ferrule includes a plurality of holes serving as a plurality of position guides and a containing unit in which a plurality of optical waveguides, each preliminarily formed in a shape of layer, can be contained in a staked manner.

Injected into the groove is resin or adhesive.

Stacked in the containing unit of the MT ferrule is a plurality of optical waveguides, each preliminarily formed in the shape of layers.

Then, with the plurality of optical waveguides contained in a stacked manner, resin or adhesive is injected through a space lying between the plurality of optical waveguides and the containing unit of the MT ferrule, so that the resin or adhesive reaches each of the plurality of optical waveguides.

As the space lying between the plurality of optical waveguides and the containing unit of the ferrule, grooves are arranged along a multilayered direction to produce active capillary phenomena.

However, if there is a space allowing capillary phenomena on the side face of the containing unit face having a shape of concave, it can be expected that resin or adhesive injected reaches each of the plurality of optical waveguides contained in the containing unit.

Thus, the meaning of the term "space" or "groove" according to the technical idea of the present invention should be broadly interpreted.

The viscosity of the injected resin or adhesive also has importance.

The viscosity of UV adhesive is 150 cps±30% or less (from about 105 cps to about 195 cps and ranges there between) that is, UV adhesive having a significantly low viscosity is used.

Figure 4:
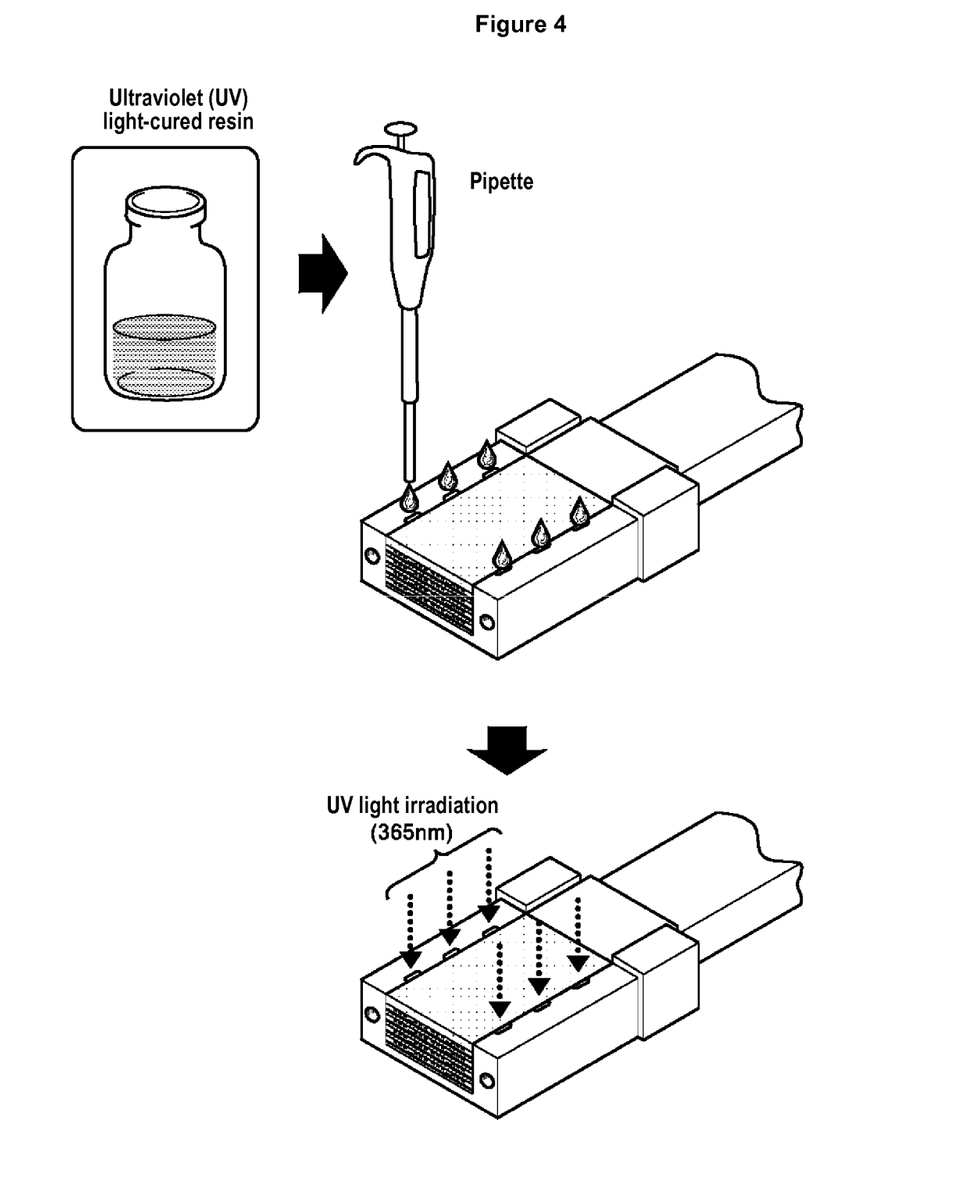
FIG. 4 is a view for explaining a method of irradiating the MT connector with UV light after injection of resin or adhesive when the MT connector is fabricated using the multiple-core optical ferrule (MT ferrule)

FIG. 4 is a view for explaining a method of irradiating the MT connector with UV light after injection of resin or adhesive when the MT connector is fabricated using the multiple-core optical ferrule (MT (Mechanically Transferable) ferrule).

Ultraviolet (UV) light-cured resin is injected by use of a pipette and then UV light of a wavelength of 365 nm is irradiated, whereby the plurality of optical waveguides stacked are unfailingly secured.

When desired, a pressure may be applied in the injection, or the injection may be encouraged by suction.

A lid may be placed on the plurality of optical waveguides stacked to maintain the secured state.

A pressure may be applied, toward the containing unit of the ferrule, on the plurality of optical waveguides stacked, or a pressure may be applied through the lid.

Figure 5:
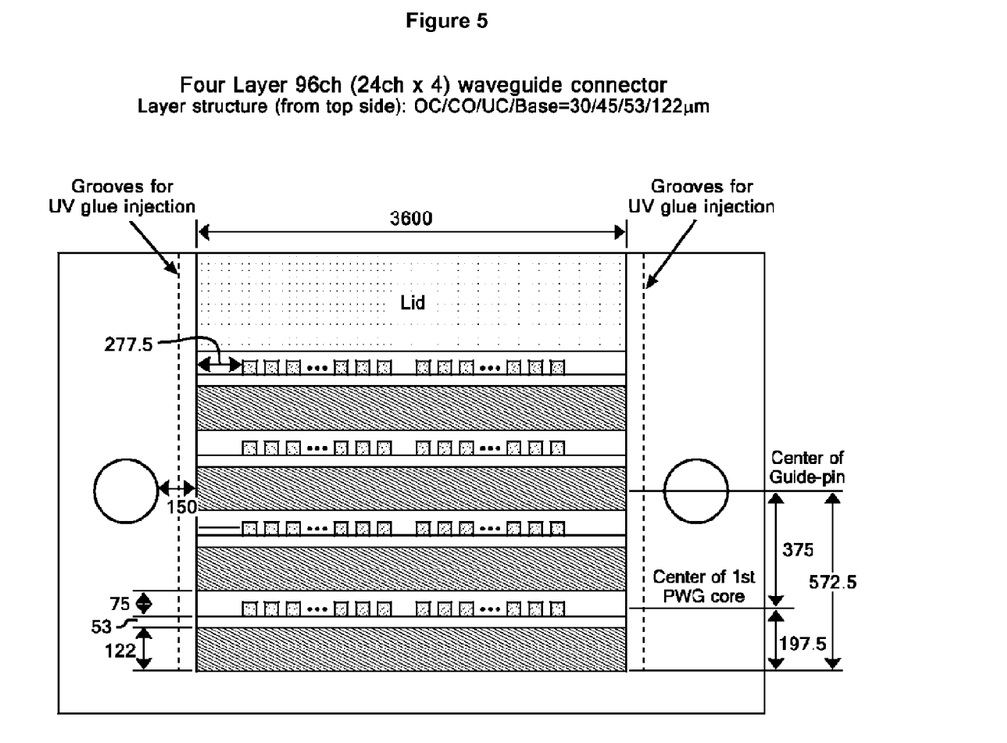
FIG. 5 is a cross-sectional view of the MT connector.

FIG. 5 is a cross-sectional view of the MT connector.

In FIG. 5, four layers of 24-channel waveguides are stacked; that is, a structure for 96 channels is formed.

This means that the number of cores in the multiple-core structure is 96.

In FIG. 5, a plurality of holes is provided; guide-pin holes are formed to serve as a plurality of position guides.

The positional relation (the actual size being 375) between the center of the guide-pin hole and the center of the core in the optical waveguide has importance.

Implementation of high-precision positioning allows collective connection of multiple cores even in the case of a single-mode optical waveguide.

The distance (the actual size being 572.5) between the center of the guide-pin hole and the fiducial face, indicated by the shape of concave, with respect to all of the plurality of holes in the containing unit also has importance.

Figure 6:
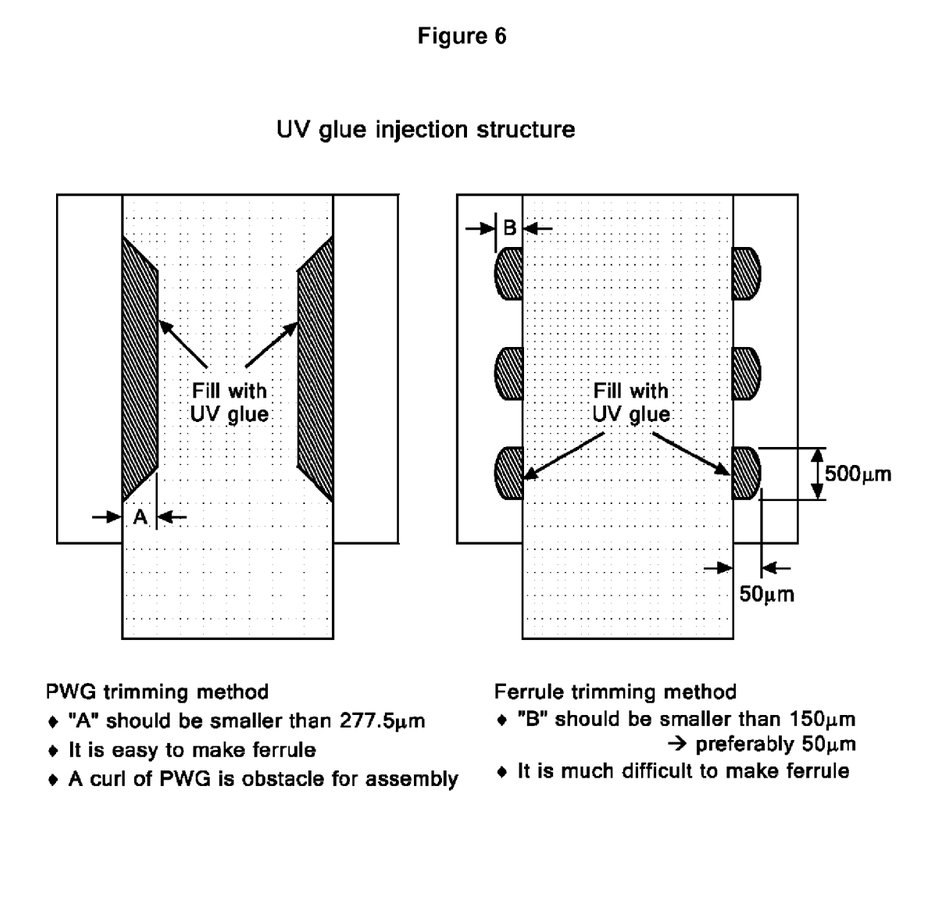
FIG. 6 is a view for explaining the grooves.

FIG. 6 is a view for explaining the grooves.

It is to be noted that the grooves are drawn in an exaggerated form.

The grooves may be formed as a trimming on the side of the ferrule to consecutively communicate with the plurality of optical waveguides stacked.

In this case, it was verified that, when the length (B) of the cross section in a multilayered direction, measured in a direction orthogonal to the waveguide direction, is smaller than 100 μm, and in addition when the viscosity of resin or adhesive injected is 150 cps±30% (from about 105 cps to about 195 cps and ranges there between) or less, then this combination of size and viscosity achieves effectiveness.

Further, it was verified that, when the length (B) of the cross section in a multilayered direction, measured in a direction orthogonal to the waveguide direction, is 50 μm±30% (from about 35 μm to about 65 μm and ranges there between) and the length in a waveguide direction is 500 μm±30% (from about 350 μm to about 650 μm and ranges there between), and in addition when the viscosity of resin or adhesive injected is 150 cps±30% (from about 105 cps to about 195 cps and ranges there between) or less, then this combination of size and viscosity achieves effectiveness.

The grooves may be formed as a trimming on the side of the optical waveguide to consecutively communicate with the plurality of optical waveguides stacked.

The length (A) of the cross section in a multilayered direction, measured in a direction orthogonal to the waveguide direction, may be smaller than 277.5 m±30% (from about 194.25 μm to about 360.75 μm and ranges there between).

Figure 7:
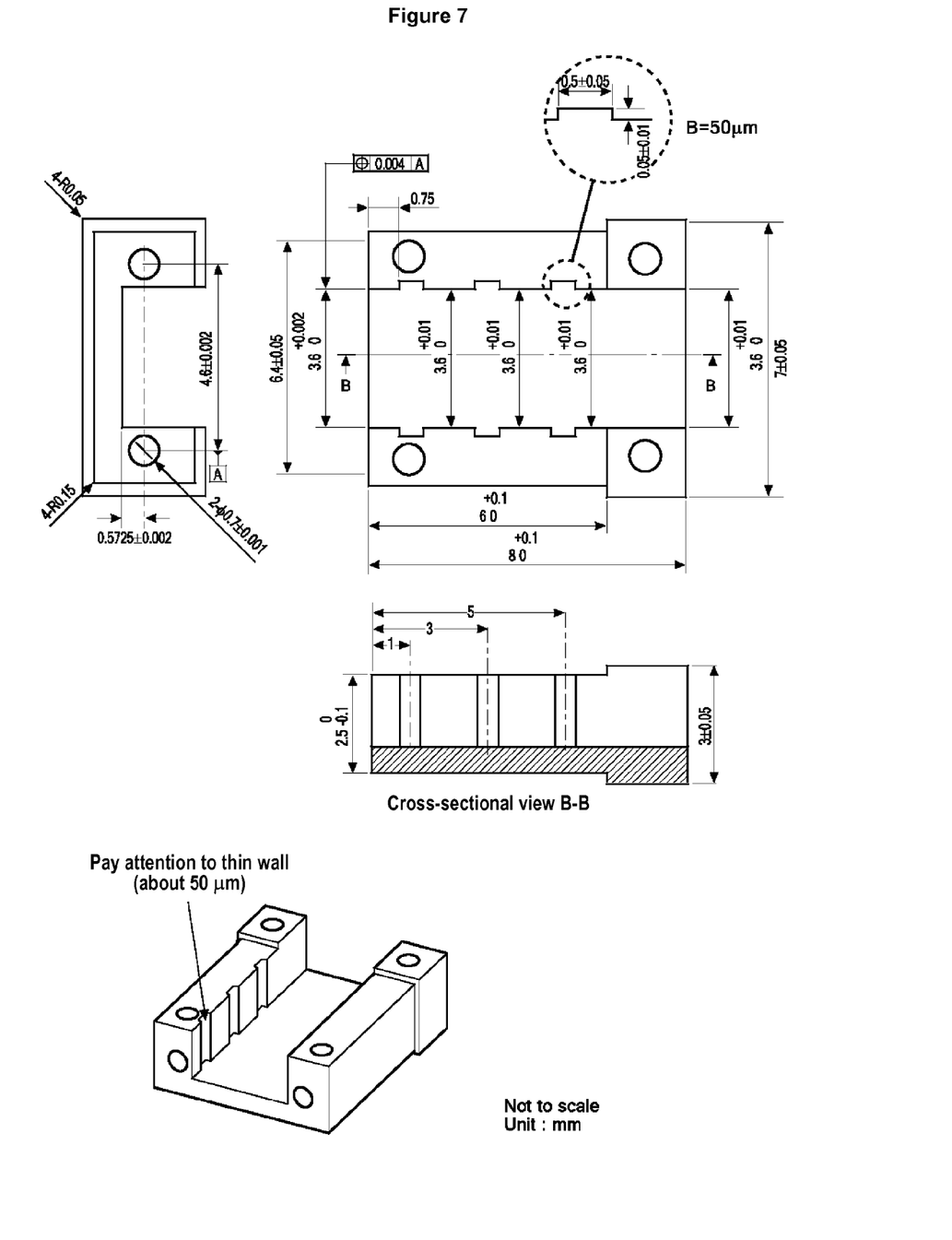
FIG. 7 is a view showing the specific dimensions of the MT ferrule.

FIG. 7 is a view showing the specific dimensions of the MT ferrule.

The present invention is applied to the MT ferrule of these dimensions to achieve the advantageous effect; thus the actual dimensions and the reduction scale based on the actual dimensions have numerical importance.

As the datum by which the fiducial is indicated in FIG. 7, and by which a theoretically accurate geometric fiducial is considered, the centers of the two guide-pin holes and the side face of the containing unit having a shape of concave are used.

Figure 8:
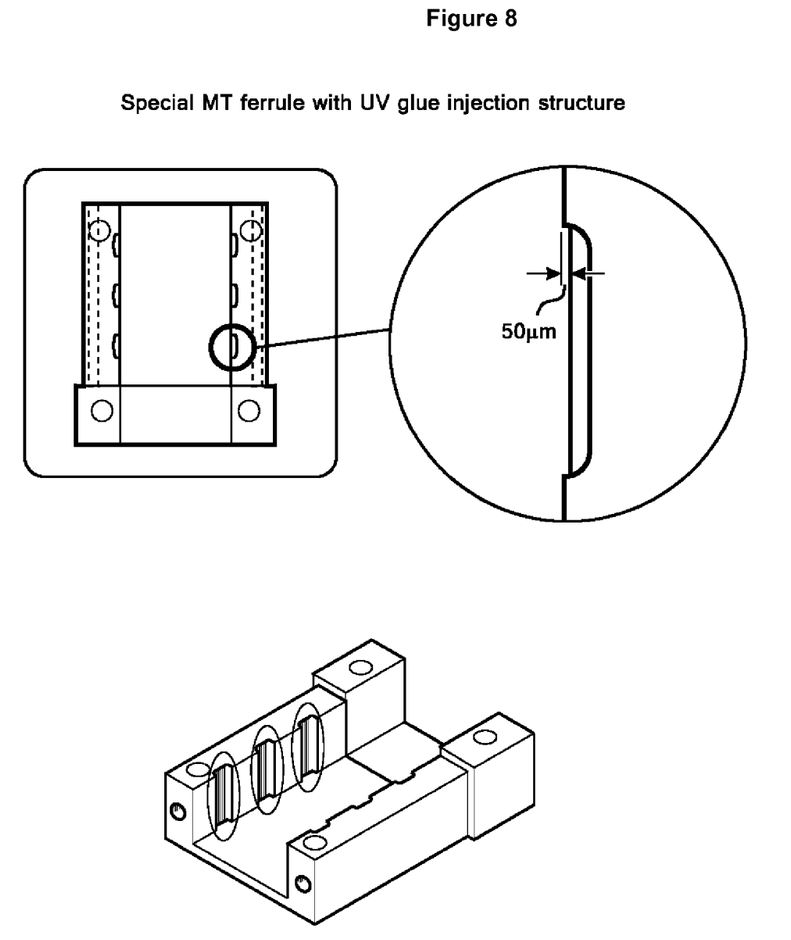
FIG. 8 is a view showing the dimensions of the grooves.

FIG. 8 is a view showing the dimensions of the grooves.

Figure 9:
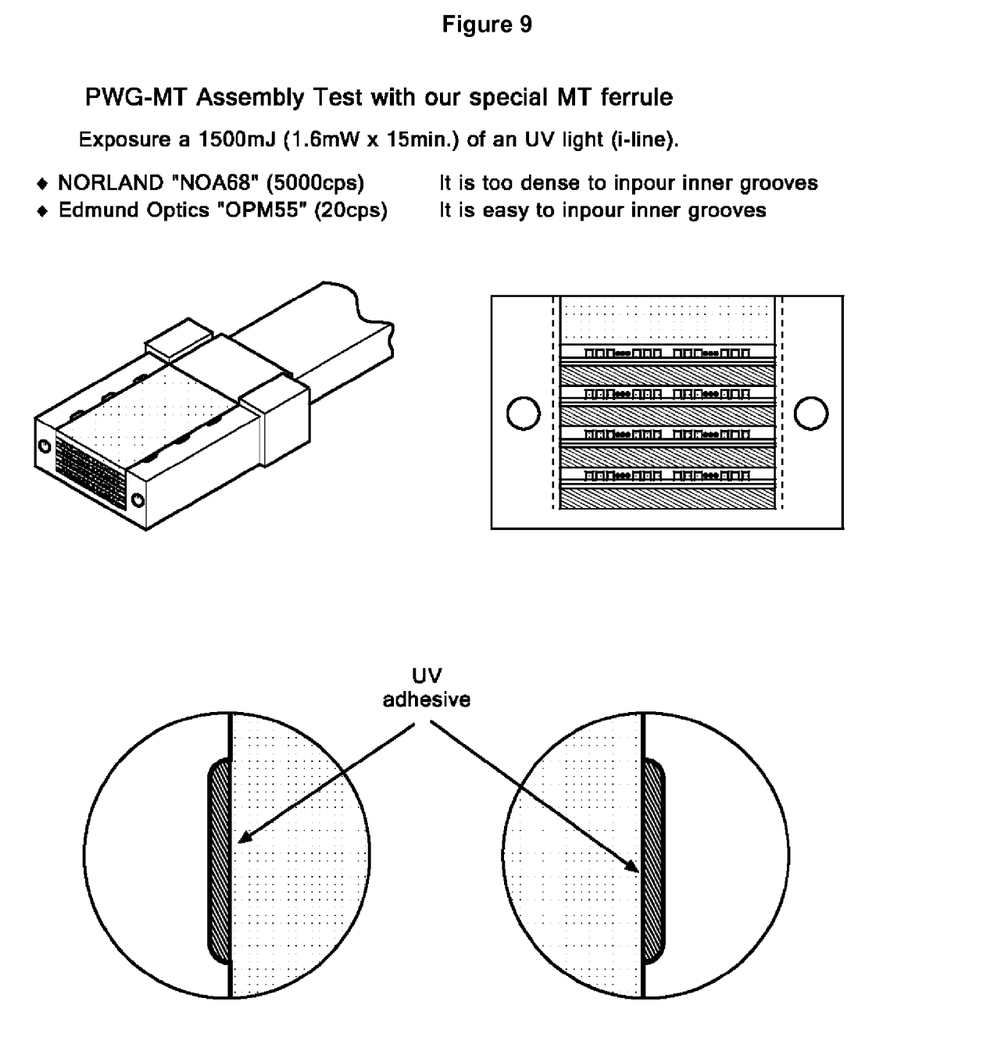
FIG. 9 is a view showing an example of experiment in which resin or adhesive different in viscosity is used.

FIG. 9 is a view showing an example of experiment in which resin or adhesive different in viscosity is used.

It was found that the in-pouring of resin or adhesive having a viscosity of 150 cps±30% (from about 105 cps to about 195 cps and ranges there between) or smaller is easy, but when the viscosity reaches 5000 cps, the in-pouring is not easy.

What is claimed is:

1. A method of fabricating a connector, the method comprising the steps of:
    stacking in a containing unit of a ferrule, which has a bottom surface between two parallel side walls, each side wall having an upper surface, a plurality of optical waveguides that are each preliminarily formed in the shape of layers, and a lid that fits entirely at or below the upper surfaces and between the side walls; and
    injecting resin or adhesive through a space lying between the plurality of optical waveguides and the containing unit of the ferrule, with the plurality of optical waveguides contained in a stacked manner so that resin or adhesive reaches each of the plurality of optical waveguides and the lid;
    wherein the space extends along the side wall between the bottom surface and the upper surface; and
    wherein the resin that is injected into the space secures the lid and the plurality of optical waveguides within the ferrule and secures the lid to the side wall.

2. The method according to claim 1, wherein:
    the ferrule includes a plurality of holes;
    the ferrule includes the containing unit;
    the containing unit is capable of containing, in a stacking manner, the plurality of optical waveguides; and
    the containing unit includes a fiducial face relative to all of the plurality of holes.

3. The method according to claim 1, wherein:
    the connector is a Mechanically Transferable (MT) connector;
    the ferrule is a multiple-core optical ferrule (MT ferrule);
    the ferrule includes a plurality of holes formed to serve as a plurality of position guides; and
    the containing unit is capable of containing, in a stacking manner, the plurality of optical waveguides.

4. The method according to claim 1, further comprising the step of:
    applying a pressure, toward the containing unit of the ferrule, on the plurality of optical waveguides stacked.

5. The method according to claim 1, wherein, as the space lying between the plurality of optical waveguides and the containing unit of the ferrule, grooves are arranged along a multilayered direction to produce active capillary phenomena.

6. The method according to claim 5, wherein the grooves are formed as a trimming on the side of the ferrule to consecutively communicate with the plurality of optical waveguides stacked.

7. The method according to claim 5, wherein the grooves are formed as a trimming on the side of the optical waveguide to consecutively communicate with the plurality of optical waveguides stacked.

8. The method according to claim 6, wherein:
    the length of the cross section in a multilayered direction, measured in a direction orthogonal to the waveguide direction, is smaller than 100 μm; and
    the viscosity of resin or adhesive injected is from about 105 cps to about 195 cps and ranges there between.

9. The method according to claim 6, wherein:
    the length of the cross section in a multilayered direction, measured in a direction orthogonal to the waveguide direction, is from about 35 μm to about 65 μm and ranges there between, and the length in a waveguide direction is from about 350 μm to about 650 μm and ranges there between; and
    the viscosity of resin or adhesive injected is from about 105 cps to about 195 cps and ranges there between.

10. The method according to claim 7, wherein:

the length of the cross section in a multilayered direction, measured in a direction orthogonal to the waveguide direction, is smaller than about 194.25 μm to about 360.75 μm and ranges there between.

11. A ferrule comprising:

a plurality of holes; and a containing unit having a bottom surface between two parallel side walls, each side wall having an upper surface, arranged so as to contain, in a stacking manner, a plurality of optical waveguides that are each preliminarily formed in the shape of layers, a space lying between the plurality of optical waveguides and the containing unit of the ferrule, and a lid that fits entirely at or below the upper surfaces and between the side walls;

wherein the space is formed by grooves which are formed in a direction perpendicular to the layers so that injected resin or adhesive reaches each of the plurality of optical waveguides and the lid, with the plurality of optical waveguides contained in a stacked manner;

wherein the grooves extend along the side wall between the bottom surface and the upper surface of the side wall; and wherein only injected resin within the grooves secures the lid and the plurality of optical waveguides within the ferrule and secures the lid to the side wall.

12. A ferrule according to claim 11, wherein:
the plurality of holes serves as a fiducial; and
the containing unit includes a fiducial face relative to all of the plurality of holes.

13. A ferrule according to claim 11, wherein:
the ferrule is a multiple-core optical ferrule, such that the ferrule is a Mechanically Transferable (MT) ferrule; and
the plurality of holes serves as a plurality of position guides.

14. The ferrule according to claim 11, wherein the containing unit has a concave shape.

15. A connector utilizing a ferrule according to claim 11, wherein the grooves are filled with injected resin or adhesive.

16. A connector utilizing a ferrule according to claim 11, wherein the lid is placed on the plurality of optical waveguides stacked.

17. The ferrule according to claim 11, wherein the waveguides are for single mode, capable of being collectively connected.

18. The ferrule according to claim 11, wherein the waveguides are for multimode, capable of being collectively connected.

19. A connector utilizing a ferrule according to claim 11, wherein the waveguides are for single mode, capable of being collectively connected.

20. A connector utilizing a ferrule according to claim 11, wherein the waveguides are for multimode, capable of being collectively connected.

* * * * *